Figure 1:
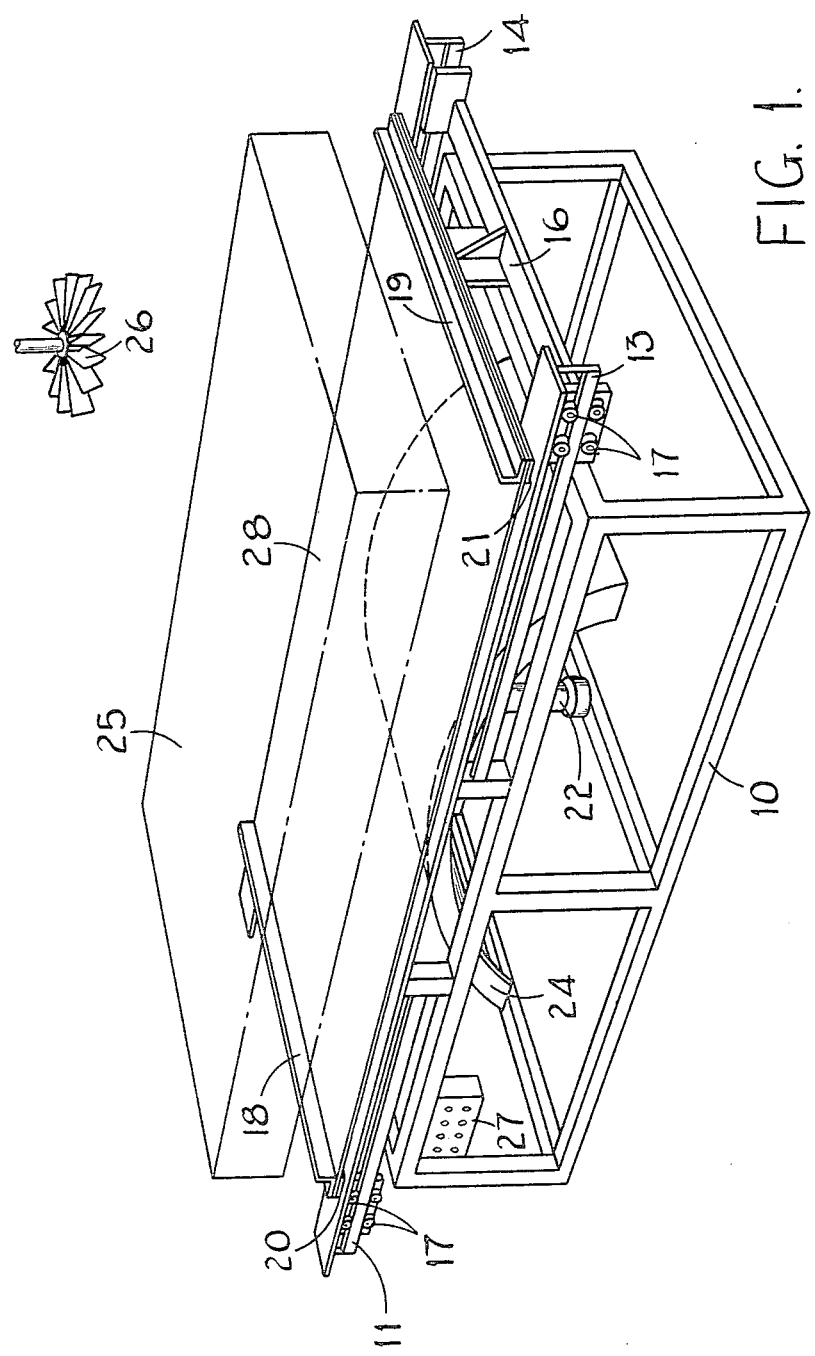

United States Patent [19]

Smith et al.

[11] 4,185,069
[45] Jan. 22, 1980

[54] PRODUCTION OF PLASTICS ARTICLES

[76] Inventors: George L. Smith, Ridgeway, Binton, Near Stratford-Upon-Avon, Warwickshire, England; Leslie J. Smith, 37 Lingfield Rd., Eastwick Park, Evesham, Worcestershire, England, WR11 6XG

[21] Appl. No.: 748,532

[22] Filed: Dec. 8, 1976

[51] Int. Cl.² .............................................. B29C 17/02
[52] U.S. Cl. .................................. 264/322; 264/292; 264/297; 425/384; 425/DIG. 48
[58] Field of Search .............. 264/291, 292, 320, 322, 264/299, 339, 297, 327; 425/DIG. 48, 388, 383, 384, 457

[56] References Cited

U.S. PATENT DOCUMENTS

| 1,587,462 | 6/1926 | Adams et al. | 264/292 |
|---|---|---|---|
| 2,666,951 | 1/1954 | Grove et al. | 264/92 |
| 2,849,026 | 8/1958 | Taplin | 264/322 |
| 2,856,634 | 10/1958 | Ames | 264/292 |
| 2,897,546 | 8/1959 | Clapp et al. | 264/339 |
| 3,020,596 | 2/1962 | Clapp et al. | 264/339 |
| 3,261,898 | 7/1966 | Caron et al. | 264/322 |
| 3,349,153 | 10/1967 | Beck | 264/89 |
| 3,389,202 | 6/1968 | Waling | 264/320 |
| 3,553,784 | 1/1971 | Shuman | 264/322 |
| 3,726,953 | 4/1973 | Jones et al. | 264/89 |

FOREIGN PATENT DOCUMENTS

| 1164641 | 3/1964 | Fed. Rep. of Germany | 264/292 |
|---|---|---|---|
| 1189702 | 3/1965 | Fed. Rep. of Germany | 425/388 |
| 1157735 | 6/1958 | France | 264/292 |

*Primary Examiner*—James B. Lowe

[57] ABSTRACT

A process for production of a re-entrant article, such as a vehicle mud guard, comprising attaching a sheet of thermo-plastic material, by its opposite edges, to trolleys on a machine, the trolleys being movable towards one another, heating the sheet to soften it, raising a former under the sheet to cause it to take up the required re-entrant form, the trolleys moving inwardly as this occurs, and then cooling the sheet to cause it to set in the required configuration.

6 Claims, 4 Drawing Figures

PRODUCTION OF PLASTICS ARTICLES

This invention relates to the production of plastics articles of the kind characterised by generally re-entrant or recessed forms. An example of the kind of article with which the invention is concerned is a mud guard for a motor vehicle which is of generally part cylindrical configuration with flanged edges. However, it is to be understood that the invention may also apply to other dished, recessed or otherwise re-entrant articles or articles including such formations, all herein referred to, for convenience as being re-entrant articles.

It is a principal object of the present invention to provide a process for the production of re-entrant articles in a simple and efficient manner.

According to this aspect of the invention, a process for the production of re-entrant articles comprises the steps of fitting a sheet of thermo plastic material to a machine, opposite edges of said sheet being secured to respective ones of a pair of trolleys which are movable towards one another on the machine, heating the sheet to soften it, raising a former to form it into a required re-entrant configuration, the trolleys being permitted to move inwardly under the tension force applied thereto by the sheet, by the raising of the former, cooling the sheet to cause it to harden to inhibit further deformation, and finally removing the article from the machine.

Another object of the invention is to provide a machine whereby this process can be performed.

According to this aspect, there is provided a machine comprising a frame, a pair of horizontally movable trolleys with respective clamps for engagement with opposite ends of plastics sheets to be worked, a former having means for raising and lowering across the horizontal plane of movement of the trolleys to deform a sheet clamped therein, and heating means arranged to heat the sheet evenly at least over a portion or portions thereof to be deformed by the former, and cooling means for cooling the sheet after deformation.

A still further object of the invention is to provide a re-entrant plastics article produced by said process.

According to this aspect, the invention resides in the re-entrant thermo plastics article formed by said process and having substantially uniform thickness throughout.

Figure 2:
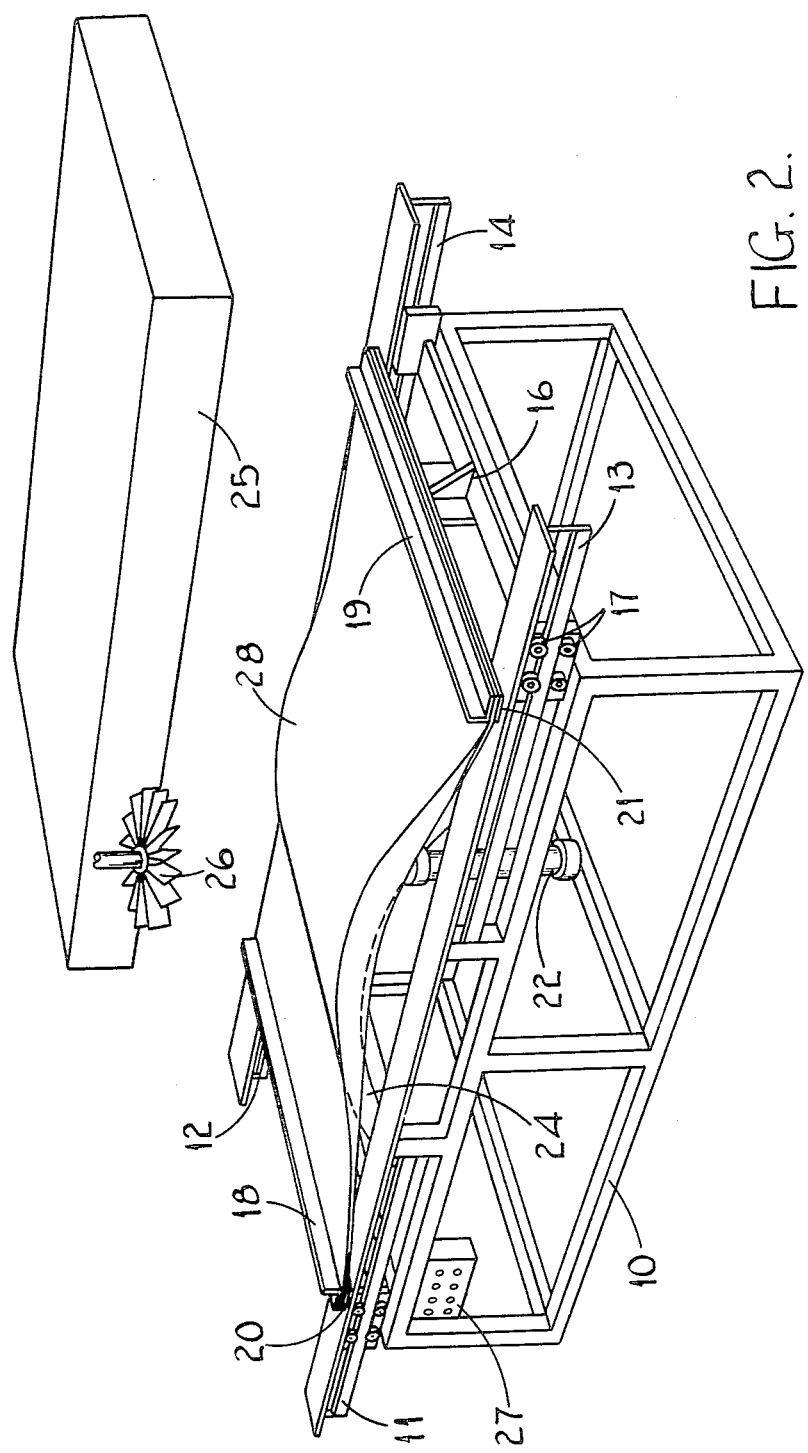
Figure 3:
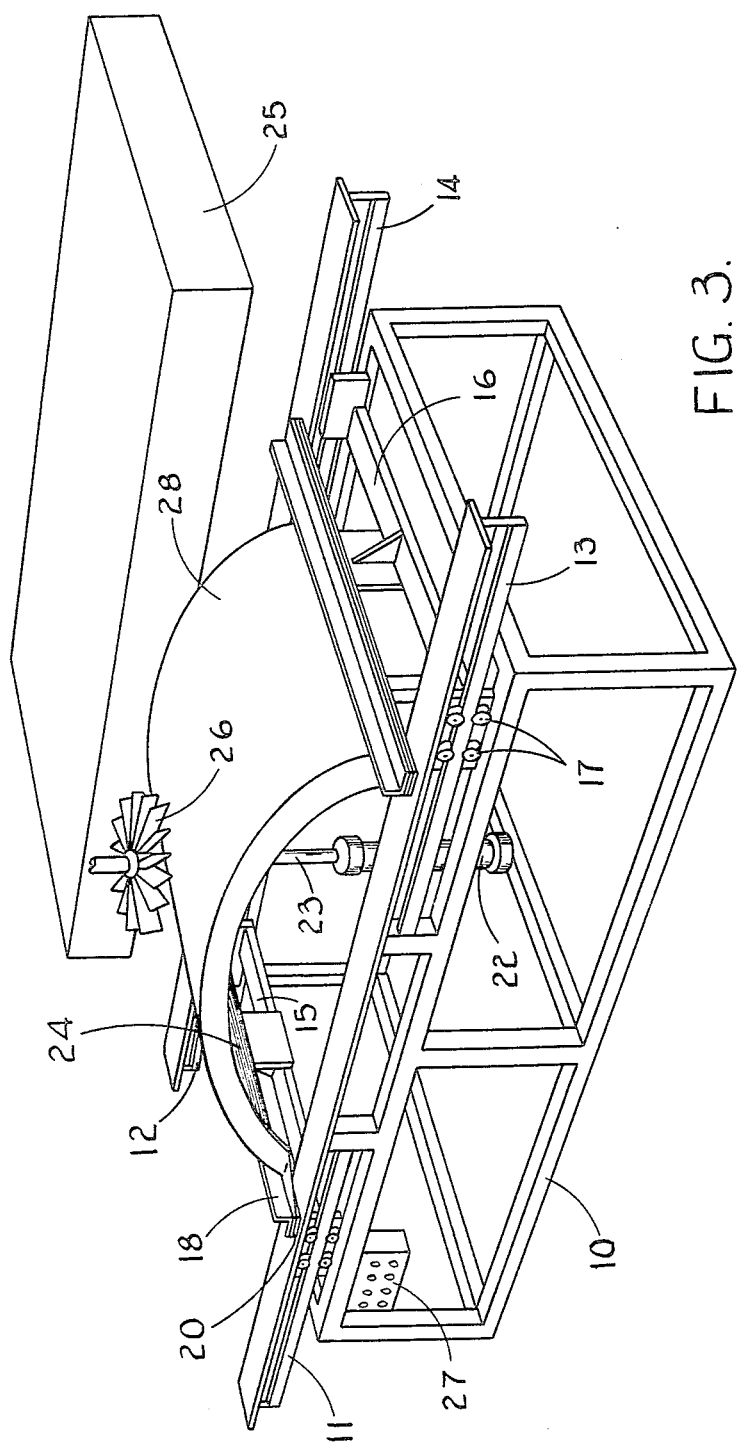
Figure 4:
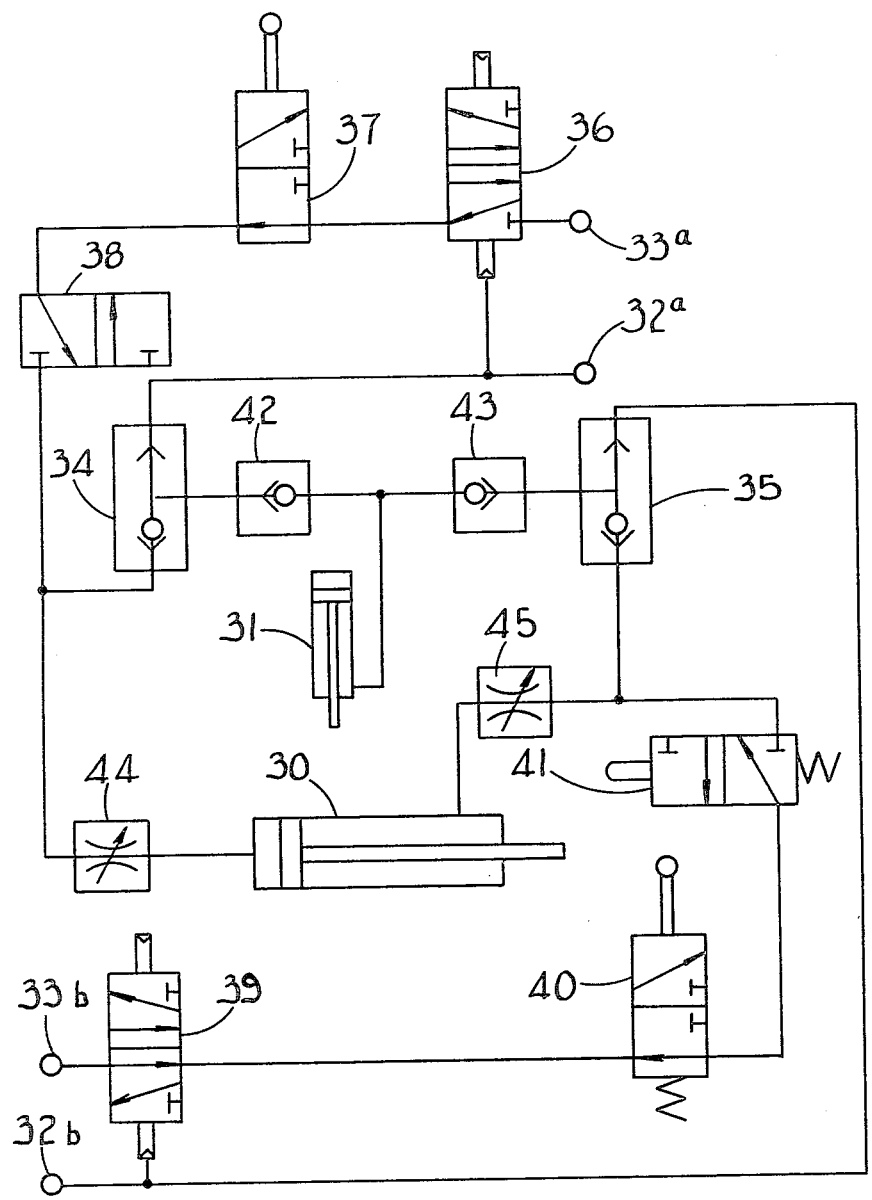

The invention will now be described by way of example with reference to the accompanying drawings in which, FIG. 1 is a perspective view of a machine constructed in accordance with the invention shown in the loaded condition, FIG. 2 is a similar view showing a plastics sheet in partly deformed condition, FIG. 3 is a similar view showing the sheet fully deformed and in position for cooling, and FIG. 4 is a diagrammatic layout of a pneumatic control circuit incorporated in a double machine construction according to the invention.

As shown in FIGS. 1, 2 and 3 the machine comprises a frame 10 which is conveniently a rigid open construction of generally rectangular configuration. This frame is made up of box and angle section members welded or otherwise joined together. The frame has mounted upon it two pairs of horizontally disposed substantially flat strip rails 11, 12, 13, 14. On each pair of rails 11, 12 or 13, 14, is mounted a respective trolley 15, 16. For mounting the trolleys there are respective sets of grooved wheels 17 engaged upon the rails respectively. Each set of wheels comprises two pairs arranged above and below the rail respectively.

The trolleys 15, 16 are freely mounted upon the rails so as to be movable towards and away from the centre of the machine in a horizontal plane.

Each trolley has a movable clamping bar 18, 19 mounted thereon respectively. In this example the clamping bars are of angle section and are arranged to be clamped to respective co-operating flat bars 20, 21 which form part of the trolleys respectfully. Provision is made for securing the clamping bars 18, 19 to their respective co-operating flat bars 20, 21 either hydraulically or mechanically in a manner not shown in the drawings. The trolleys may incorporate means for attachment of additional weights, whereby the force required to move the trolleys along the rails can be adjusted.

The frame 10 of the machine has mounted on its centre a hydraulic or pneumatic piston and cylinder device 22, the ram 23 of which carries a shaped former 24. In this example, the former is the shape of a vehicle mud guard to be produced by the machine. It is to be understood, however, that other former configurations may be substituted to produce required re-entrant articles. The former shown thus has a semicylindrical configuration, the curved ends being provided with flanges of uniform width as shown. A former is preferably covered with a material to which thermo plastics material will not adhere. A woolen fabric covering is suitable. The former 24 is made from sheet metal and is substantially identical to the shape of the finished product, though it is slightly smaller.

Above the frame is suspended a heater box 25 which can be raised and lowered (in a manner not shown). The heater box 25 is rectangular and has top, side and end walls of sheet metal. It contains heating elements over substantially the whole of its area arranged to radiate heat in a downward direction. The heater box is moreover movable laterally with respect to the frame so that when it is not in use, it is removed from its normal heating position over the frame.

A suspended cooling fan 26 is provided over the frame and this can be used when the heater box 25 is removed from its position over the frame.

A switch panel 27 is provided on the frame 10. This initiates actuation of the hydraulic or pneumatic circuit for raising and lowering the former 24 by means of its piston and cylinder unit 22 and for energising the heaters, the heater box movement control apparatus and also the fan 26.

FIGS. 1, 2 and 3 illustrate the machine in various stages during the production of a vehicle mud guard. FIG. 1 shows the machine loaded with a sheet 28 of thermo plastics material. This sheet is rectangular and is initially flat. Its narrower ends are firmly clamped under the clamping bars 18 and 19 respectively on the trolleys 15 and 16 respectively. The trolleys moreover are at the outward ends of their travels. The sheet when cool is relatively rigid, but upon heating it softens as will be described. The heater box 25 is lowered from the position shown into close proximity to the sheet 28 and the heaters are energised. The heater box area is substantially the same as that of the sheet 28 so that the sheet becomes substantially uniformly heated.

When the sheet 28 has softened to a desired degree, the heater box 25 is raised and subsequently moved transversely so that it is no longer over the sheet 28. The former 24 is now raised by means of its piston and cylinder unit 22. This operation causes deformation of the sheet 28 so that it tends to take up the shape of the former 24. FIGS. 2 and 3 show intermediate and final stages of raising of the former. While the former is being raised, the sheet 28 applies tension to the clamping bars 18, 19 which, being attached to the trolleys 15, 16, tend to pull these trolleys along their rails 11, 12, 13, 14 respectively towards one another. This movement of the trolleys can be clearly seen from the three views. It is important that the trolleys shall be free to move under the application of tension through the thermo plastics sheet 28 only, though they may be weighted as previously described to retard their inward movement.

It is also important that the speed of raising of the former 24 is controlled. If it is too fast the thermo plastic sheet 28 will be unduly stretched, thus reducing its thickness in certain zones, but if it is moving too slowly the trolleys will fail to move inwards, with the result that the sheet 28 will not wrap closely around the lowermost extremities of the former 24.

The raising of the former 24 will, as illustrated, cause the thermo plastics sheet 28 to take up the semi-cylindrical contour of the former but also will form respective edge flanges similar to those on the former itself.

FIG. 3, shows the former in its fully raised position. This is the position in which cooling of the thermo plastics sheet takes place. For this purpose the fan 26 is energised to blow cool air onto the upwardly presented surface of the sheet 28.

In order to prevent creep of the extremities of the two curved flanges formed on the sheet 28 it may be necessary to hold these inwardly against the corresponding flanges of the former 24. One expedient which has been used for this purpose, is to attach the two extremities of the same flange together by means of clips connected by a wire. However, mechanical parts may be incorporated to accomplish this purpose. Apparatus used for this purpose, however, must not stretch or elongate the material when it is in the softened state since this would result in reduction in the material thickness.

When the sheet 28 has been cooled to a temperature at which it is substantially rigid, it is removed from the former 24.

Upon completion of the process the curved flanges of the mud guard may be larger than those of the former 24 and the additional material may be cut off by hand or by means of suitable automatic or semi-automatically operable machinery. Similarly flanges formed along the transverse ends of the mud guard which were clamped by the clamping bars 18 and 19 may also be trimmed off manually or by suitable machinery.

In a convenient arrangement, two of the machines illustrated are arranged side by side and the heater box 25 may be movable between positions aligned with the two machines respectively. Thus, while the heating of one sheet is taking place, the cooling of another on an adjacent machine may take place and vice versa.

FIG. 4 shows a pneumatic control circuit for such a dual machine installation. The heater box 25 is mounted upon an overhead support structure and can move laterally between positions aligned above the two machines respectively. To move it laterally a pneumatically actuated double acting piston and cylinder unit 30 is provided. The heater box 25 can also be raised and lowered in either of said two positions and to accomplish this a further piston and cylinder unit 31 is furnished.

There are pilot and main air or other fluid supplies, these being identified at 32 and 33 respectively. Two inputs from each are shown and differentiated by suffixes a and b respectively. The pilot supplies 32 communicate with respective shuttle valves 34, 35, to which the main supplies 33 are also connected. The main supplies reach these shuttle valves 34, 35 through respective valves 36, 37, 38 and 39, 40, 41. From the shuttle valves 34, 35 air can reach one end of the raising and lowering unit 31, through respective non return valves 42, 43.

Main supplies 33 can also reach opposite ends of the lateral control unit 30 through respective adjustable restrictors 44, 45, which are used to regulate the speed at which the lateral travel of the heater box takes place.

The two sets of valves 36, 37, 38 and 39, 40, 41 are the same in function in the respective main supply lines. The valves 36, 39 are actuated by the pilot air supplies. These valves select the side of the system which is rendered operative in accordance with the selected pilot supply 32a or b. The valves 37 and 40 are operable by contact with the heater box support structure, these valves being provided with respective contact rollers for this purpose. The valves 38 and 41 are plunger operated and are mounted upon the heater box 25 to contact the support structure when the box reaches its upper position.

The cycling arrangement comprises feeding pilot supply from either supply 32a or 32b to actuate the valve 36 or the valve 39. Also supplied with pilot air is the appropriate shuttle valve 34 or 35. This raises the heater box by means of the unit 31. When the valve 38 or 41 on top of the heater box is actuated, air from the main supply can reach the appropriate end of the cylinder of the lateral movement unit 30. To ensure that the heater box remains in its raised position during lateral movement, air reaches the valve 34 or 35 from the main supply, to keep the unit 31 in the upward position.

As the heater box reaches its new position, the valve 37 or 40 contacts the support structure and cuts off the main supply of air. The heater box can now lower since the supply to the unit 31 is also cut off. When the valve 38 and 41 opens the system can exhaust.

The apparatus may furthermore be automated by incorporation of handling devices for loading and unloading the thermo plastics sheets and the cycling of the apparatus may be controlled by means of an electronic programming control circuit. The clamping means, movement control, loading and unloading apparatus may be operated in predetermined timed sequence.

Preferably, though not exclusively, the plastics material is high density polyethylene and is produced in extruded sheets. However, other materials such as polypropylene or acrylonitrile butadiene styrene may be worked with apparatus in accordance with the invention.

It is possible to vary the thickness of the sheet within small limits, and it has been found that the process tends very slightly to increase the thickness of the sheet over its whole area. An extremely good surface finish is achieved since while the material is in softened condition, it is not in contact with anything which might mark the surface or to which the material might stick.

In order to prevent the material sticking to the former 24, it has been explained that this is furnished with a wool surface. The use of wool has the advantage that high temperatures can be reached without significant deterioration. The clamping bars may moreover be furnished with highly polished surfaces to prevent sticking, or alternatively, sheets of a material to which the thermo plastic material will not readily adhere, may be provided between the clamping bars and the material itself.

We claim:

1. A method of producing an article from thermoplastic flat sheet material, said article having a re-entrant configuration, comprising the steps of supporting said sheet along two opposite edges thereof in clamping means mounted respectively on a pair of trolleys freely movable in a plane parallel to the plane of said sheet, applying heat to said sheet until said sheet has reached a predetermined degree of plasticity, thereafter applying a former to said sheet and moving said former in a direction transverse with respect to the plane of said sheet and against the resistance of said sheet to draw said trolleys toward each other thereby causing said sheet to form into a re-entrant configuration corresponding to that of said former without significant change in the overall thickness of said sheet.

2. The method according to claim 1, wherein said former is moved in a direction perpendicular to the plane of said sheet.

3. The method according to claim 1, wherein the speed of movement of the former is controlled thereby to prevent unduly stretching the sheet.

4. The method according to claim 1 wherein said sheet is heated on one side by heating means lowered to a heating position above said sheet until said predetermined degree of elasticity is reached and thereafter raising said heating means prior to movement of said former.

5. The method according to claim 1 including the step of moving said heating means, after raising thereof, laterally over a further machine at which the same process is carried out.

6. The method according to claim 1 including the steps of cooling the formed sheet while in contact with said former and thereafter removing said formed sheet from said former and said clamping means.

* * * * *